United States Patent
You et al.

(10) Patent No.: US 9,927,565 B2
(45) Date of Patent: Mar. 27, 2018

(54) LIGHT GUIDE PLATE AND DISPLAY DEVICE HAVING THE SAME

(71) Applicant: Samsung Display Co., Ltd., Yongin-Si, Gyeonggi-Do (KR)

(72) Inventors: Junwoo You, Seongnam-si (KR); Taeho Lee, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 13 days.

(21) Appl. No.: 15/097,352

(22) Filed: Apr. 13, 2016

(65) Prior Publication Data

US 2017/0059760 A1 Mar. 2, 2017

(30) Foreign Application Priority Data

Aug. 31, 2015 (KR) .................. 10-2015-0123037

(51) Int. Cl.
*F21V 7/04* (2006.01)
*F21V 8/00* (2006.01)

(52) U.S. Cl.
CPC ........... *G02B 6/0003* (2013.01); *G02B 6/002* (2013.01); *G02B 6/0018* (2013.01); *G02B 6/0026* (2013.01); *G02B 6/0068* (2013.01)

(58) Field of Classification Search
CPC ... G02F 2001/133614; G02F 1/133615; G02F 1/133514; G02F 1/133524; G02F 1/133603; G02F 2202/108; G02B 6/0026; F21K 9/64; F21K 9/61
USPC ........................................................ 362/611
See application file for complete search history.

(56) References Cited

U.S. PATENT DOCUMENTS

| 2012/0113672 | A1 | 5/2012 | Dubrow et al. |
| 2012/0154417 | A1* | 6/2012 | Ninan ................ G02B 27/2264 345/581 |
| 2013/0009180 | A1* | 1/2013 | Kim ..................... G02B 6/0026 257/89 |
| 2014/0168571 | A1* | 6/2014 | Hyun ................ G02F 1/133615 349/61 |

(Continued)

FOREIGN PATENT DOCUMENTS

| JP | 2013-544018 A | 12/2013 |
| KR | 1020110058241 A | 6/2011 |

(Continued)

*Primary Examiner* — Thien M Le
(74) *Attorney, Agent, or Firm* — Cantor Colburn LLP (57) ABSTRACT

A light guide plate includes a light conversion portion which transmits a transmission incident light having a first wavelength, and converts a conversion incident light having the first wavelength to a converted light having a second wavelength; and a light guide portion which guides the transmission incident light and the converted light in a first direction. The light conversion portion includes a light incident surface which receives the transmission incident light and the conversion incident light, an inclined side surface inclined with respect to the light incident surface to form an inclined angle with the light incident surface, quantum dots which convert light having the first wavelength to light having the second wavelength and are distributed in a quantum area on the light incident surface and the inclined side surface, and a reflector adjacent to the inclined side surface in a second direction opposite to the first direction.

19 Claims, 5 Drawing Sheets

(56) References Cited

U.S. PATENT DOCUMENTS

| | | | |
|---|---|---|---|
| 2015/0117052 A1* | 4/2015 | Hsu | G02B 6/0043 362/606 |
| 2015/0176777 A1* | 6/2015 | Hikmet | H01L 33/504 362/84 |
| 2016/0054501 A1* | 2/2016 | Hikmet | G02B 6/0003 362/606 |
| 2016/0093677 A1* | 3/2016 | Tseng | G02B 5/201 362/84 |
| 2016/0177181 A1* | 6/2016 | Liu | G02B 5/22 362/606 |
| 2016/0341876 A1* | 11/2016 | Chen | G02B 6/0026 |

FOREIGN PATENT DOCUMENTS

| | | |
|---|---|---|
| KR | 1020120010208 A | 2/2012 |
| KR | 1020120066322 A | 6/2012 |
| KR | 1020140115924 A | 10/2014 |
| KR | 1020150029173 A | 3/2015 |

\* cited by examiner

LIGHT GUIDE PLATE AND DISPLAY DEVICE HAVING THE SAME

This application claims priority to Korean Patent Application No. 10-2015-0123037, filed on Aug. 31, 2015, and all the benefits accruing therefrom under 35 U.S.C. § 119, the content of which in its entirety is herein incorporated by reference.

BACKGROUND

1. Field

The invention relates to a light guide plate and a display device having the same. More, the invention relates to a light guide plate having improved light conversion efficiency with respect to a light incident thereto and a display device having the light guide plate.

2. Description of the Related Art

In general, a liquid crystal display device is operated using optical anisotropy and polarization of liquid crystals. Since liquid crystal molecules have a relatively thin and long structure, the liquid crystal molecules have directivity while being arranged. The arrangement direction of the liquid crystal molecules is controlled by applying an electric field to the liquid crystals.

That is, when the arrangement of the liquid crystal molecules is changed by the electric field, a light is refracted to correspond to the arrangement direction of the liquid crystal molecules due to the optical anisotropy of the liquid crystal molecules, thereby displaying an image.

The liquid crystal display device is manufactured by an array substrate manufacturing process in which a gate line, a data line, a thin film transistor and a pixel electrode are disposed in an array substrate, a color filter substrate manufacturing process in which a black matrix, a color filter and a common electrode are disposed in a color filter substrate, a cell process in which the array substrate and the color filter substrate are cut in the unit of a display cell after the array substrate is coupled to the color filter substrate and then the liquid crystals are injected between the array substrate and the color filter substrate to form a unit display panel, and a module process in which a driving integrated circuit ("IC") and a printed circuit board are attached to the unit display panel and the unit display panel is assembled with a backlight unit to complete the liquid crystal display device.

In particular, the backlight unit is employed in the liquid crystal display device since the liquid crystal molecules of the liquid crystal display device are not self-emissive. The backlight unit includes a light source and is classified into a direct-illumination type backlight unit and an edge-illumination type backlight unit.

As the light source, a fluorescent lamp, such as a cold cathode fluorescent lamp, an external electrode fluorescent lamp, etc., is widely used, but the fluorescent lamp is being replaced with a light emitting diode since the light emitting diode has advantages of relatively low power consumption, light weight, high brightness, etc., when compared with the fluorescent lamp.

For the direct-illumination type backlight unit, lamps or light emitting diodes are disposed right under a liquid crystal display panel of a liquid crystal display device, and thus the light emitted from the lamps or the light emitting diodes are directly provided to the liquid crystal display panel. For the edge-illumination type backlight unit, a light guide plate is disposed under the liquid crystal display panel and the lamps or the light emitting diodes are disposed adjacent to one side surface of the light guide plate, and thus, the light emitted from the lamps or the light emitting diodes are provided to the liquid crystal display panel after being refracted and reflected by and passing through the light guide plate.

SUMMARY

One or more exemplary embodiment of the invention provides a light guide plate having improved light conversion efficiency with respect to a light incident thereto.

One or more exemplary embodiment of the invention provides a display device having the light guide plate.

An exemplary embodiment of the invention provides a light guide plate including a light conversion portion at which a transmission incident light having a first wavelength and is transmitted, and a conversion incident light having the first wavelength is converted to a converted light having a second wavelength different from the first wavelength, and a light guide portion which guides the transmission incident light and the converted light in a first direction away from the light conversion portion. The light conversion portion includes a light incident surface which faces the light source and receives the transmission incident light and the conversion incident light; an inclined side surface inclined with respect to the light incident surface to form an inclined angle with the light incident surface; quantum dots which convert light having the first wavelength to light having the second wavelength, the quantum dots distributed in a quantum area disposed on the light incident surface and on the inclined side surface, and a reflector disposed adjacent to the inclined side surface in a second direction opposite to the first direction.

The light guide portion may be disposed adjacent to the light conversion portion in the first direction.

The conversion incident light may include a first conversion incident light and a second conversion incident light. The conversion light may include a first converted light having the second wavelength, the quantum dots distributed in the quantum area converting the first conversion incident light to the first converted light before the first conversion incident light is reflected by the reflector, and a second converted light having the second wavelength, the quantum dots distributed in the quantum area converting the second conversion incident light to the second converted light after the second conversion incident light is reflected by the reflector.

The reflector may reflect the transmission incident light, the first conversion light, and the second conversion incident light to the light guide portion.

The inclined angle may be an acute angle.

The first wavelength may correspond to a blue color and the second wavelength may correspond to a yellow color.

A body of the light guide plate may define the light incident surface and the inclined side surface which is inclined with respect to the light incident surface. The quantum area may be defined within the body of the light guide plate as an area between a first quantum surface spaced apart from the inclined side surface by a first distance in the first direction and a second quantum surface spaced apart from the inclined side surface by a second distance in the first direction. The second distance may be greater than the first distance, and at least one of the first and second quantum surfaces may be substantially parallel to the inclined side surface.

An exemplary embodiment of the invention provides a light guide plate including a light conversion portion at which a transmission incident light having a first wavelength is transmitted, and a conversion incident light having the first wavelength is converted to a converted light having a second wavelength different from the first wavelength, and a light guide portion which guides the transmission incident light and the converted light in a first direction away from the light conversion portion. The conversion portion includes a light incident surface which faces the light source and receives the transmission incident light and the conversion incident light, an inclined side surface inclined with respect to the light incident surface to form an inclined angle with the light incident surface, a reflector disposed adjacent to the inclined side surface in a second direction opposite to the first direction, and a quantum sheet disposed between the inclined side surface and the reflector, the quantum sheet including distributed therein quantum dots which convert light having the first wavelength to light having the second wavelength.

The light source may be disposed adjacent to a lower side of the light incident surface, may generate the transmission incident light and the conversion incident light and may emit the transmission incident light and the conversion incident light to the light incident surface.

The conversion incident light may include a first conversion incident light and a second conversion incident light. The conversion light may include a first converted light having the second wavelength, the quantum dots distributed in the quantum sheet converting the first conversion incident light to the first converted light before the first conversion incident light is reflected by the reflector, and a second converted light having the second wavelength, the quantum dots distributed in the quantum sheet converting the second conversion incident light to the second converted light after the second conversion incident light is reflected by the reflector.

The reflector may reflect the transmission incident light, the first conversion light, and the second conversion incident light to the light guide portion.

The inclined angle may be an acute angle.

The first wavelength may correspond to a blue color and the second wavelength may correspond to a yellow color.

An exemplary embodiment of the invention provides a display device including a backlight assembly which generates white light; and a display panel which receives the white light from the backlight assembly and displays an image using the white light. The backlight assembly includes a light source which generates and emits a transmission incident light having a first wavelength and a conversion incident light having the first wavelength; and a light guide plate. The light guide plate includes a light conversion portion which receives the transmission and conversion incident lights and converts the first wavelengths thereof to a converted light having a second wavelength different from the first wavelength, and a light guide portion which guides the transmission incident light and the converted light in a first direction away from the light conversion portion and emits the white light including both the transmission incident light and the converted light. The light conversion portion includes a light incident surface which receives the transmission incident light and the conversion incident light, an inclined side surface inclined with respect to the light incident surface to form an inclined angle with the light incident surface, quantum dots which convert light having the first wavelength to light having the second wavelength, the quantum dots distributed in a quantum area partially disposed on the light incident surface and the inclined side surface, and a reflector disposed adjacent to the inclined side surface in a second direction opposite to the first direction.

The light guide plate may extend from the light conversion portion in the first direction.

The light source may be disposed adjacent to a lower side of the light incident surface, may generate the transmission incident light and the conversion incident light and may emit the transmission incident light and the conversion incident light to the light incident surface.

The conversion incident light may include a first conversion incident light and a second conversion incident light. The conversion light may include a first converted light having the second wavelength, the quantum dots distributed in the quantum area convert the first conversion incident light to the first converted light before the first conversion incident light is reflected by the reflector, and a second converted light having the second wavelength, the quantum dots distributed in the quantum area convert the second conversion incident light to the second converted light after the second conversion incident light is reflected by the reflector.

The reflector may reflect the transmission incident light, the first conversion light, and the second conversion incident light to the light guide portion.

The inclined angle may be an acute angle.

According to one or more exemplary embodiment of the invention, the light guide plate includes the quantum dots which convert a wavelength of the incident light at least two times. Accordingly, when the blue incident light is converted to the white light, the conversion efficiency of the blue light may be improved. In addition, since the first and second conversions of the incident light are performed by using the reflector and the inclined side surface, the process cost of manufacturing the light guide plate may be reduced.

BRIEF DESCRIPTION OF THE DRAWINGS

The above and other advantages of the invention will become readily apparent by reference to the following detailed description when considered in conjunction with the accompanying drawings where.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, the invention will be explained in detail with reference to the accompanying drawings.

Figure 1A:
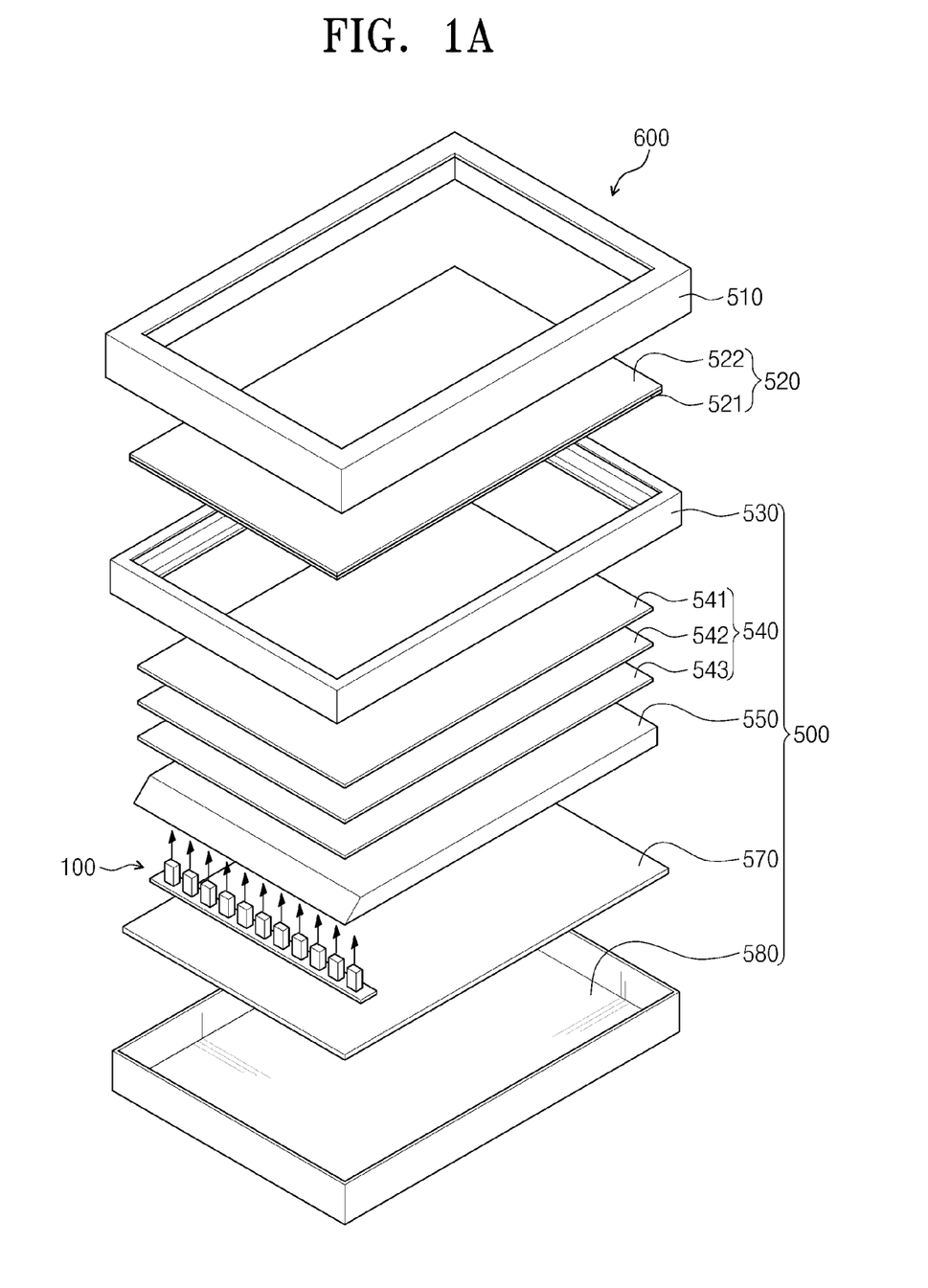
FIG. 1A is an exploded perspective view showing an exemplary embodiment of a display device according to the invention.
Figure 1B:
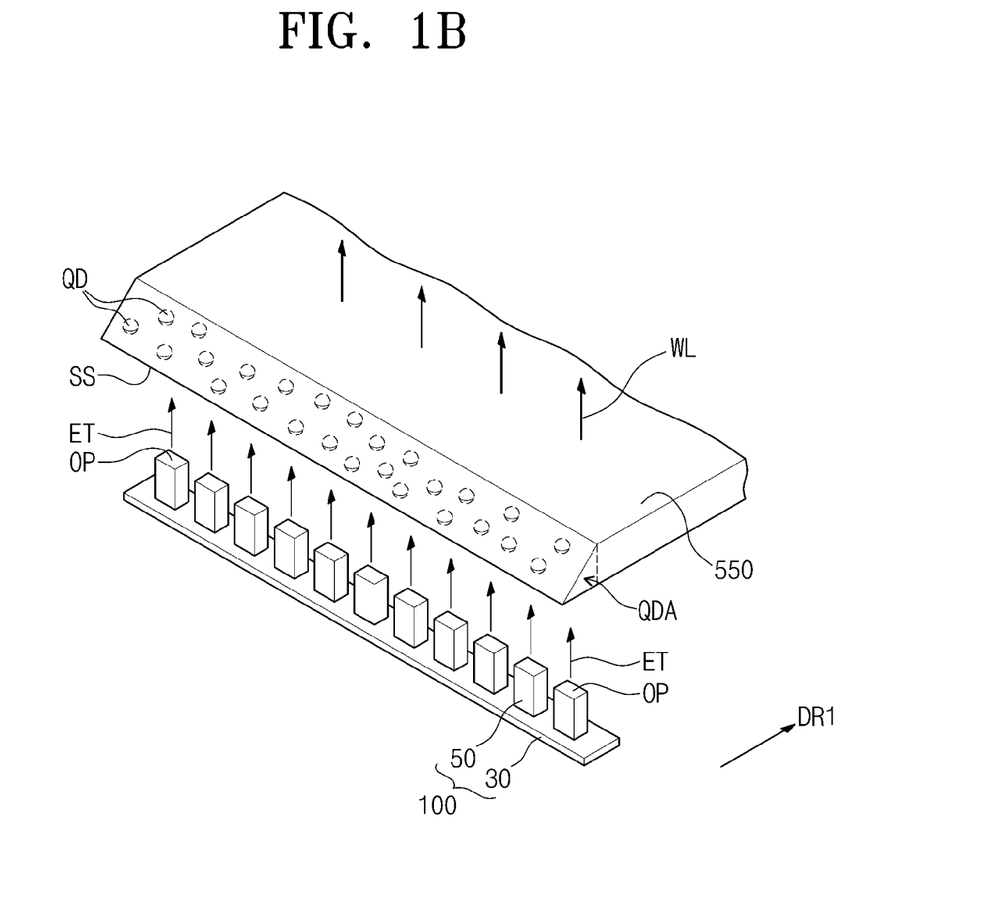
FIG. 1B is an enlarged perspective view showing an exemplary embodiment of a portion of a light guide plate in the display device shown in FIG. 1A.

FIG. 1A is an exploded perspective view showing an exemplary embodiment of a display device 600 according to the invention and FIG. 1B is an enlarged perspective view showing an exemplary embodiment of a portion of a light guide plate 550 of the display device 600 shown in FIG. 1A.

Referring to FIGS. 1A and 1B, the display device 600 includes a backlight assembly 500 and a display panel 520. The backlight assembly 500 generates and provides a light to the display panel 520 and the display panel 520 displays an image using the light.

The display panel 520 may be, but not limited to, a liquid crystal display panel. For the liquid crystal display panel, the display panel 520 includes a display substrate 521, an opposite substrate 522, and a liquid crystal layer (not shown) interposed between the display substrate 521 and the opposite substrate 522. The display substrate 521 includes a plurality of pixel electrodes (not shown) respectively arranged in a plurality of pixel areas and the opposite substrate 522 includes a common electrode (not shown) facing the pixel electrodes.

The display panel 520 is described as a liquid crystal display panel, but it should not be limited thereto or thereby. In exemplary embodiments, for instance, various display panels, e.g., an electrophoretic display panel, an electrowetting display panel, etc., may be used as the display panel 520.

In addition, the structure of the display panel 520 should not be limited to the above-mentioned structure. In exemplary embodiments, for instance, the opposite substrate 522 may not include the common electrode and instead, the display substrate 521 may include the common electrode disposed spaced apart from the pixel electrodes.

The backlight assembly 500 includes a light emitting unit 100, an accommodating member 580, a reflective plate 570, a light guide plate 550, a mold frame 530 and a plurality of sheets 540.

The light emitting unit 100 generates and emits the light. The light emitting unit 100 includes a printed circuit board 30 and a light emitting diode package 50 provided in plural. The light emitting diode packages 50 are mounted on the printed circuit board 30. Each of the light emitting diode packages 50 provides an exit light ET to the light guide plate 550 through a light exit portion (or surface) OP of the light emitting diode package 50.

The printed circuit board 30 is disposed adjacent to one side surface portion of the light guide plate 550 and lengthwise elongated along an light incident surface SS of the light guide plate 550. In addition, the light exit portion OP from which the exit light ET generated by the light emitting diode packages 50 exits faces the light incident surface SS. The light emitting diode packages 50 are arranged on the printed circuit board 30 along a length of the light incident surface SS. Accordingly, the exit light ET is incident to the light guide plate 550 through the light incident surface SS.

A first group of the light emitting diode packages 50 are described arranged along the length of the light incident surface SS at a first side surface of the light guide plate 550, but the number and position of the light emitting diode packages 50 should not be limited thereto or thereby. That is, the backlight assembly 500 may further include a second group of the light emitting diode packages 50 arranged along another (second) side surface portion of the light guide plate 550 in addition to the light emitting diode packages 50 at the first side surface of the light guide plate 550.

The light guide plate 550 may have a substantially plate shape in which one side surface portion thereof is inclined. The light guide plate 550 guides the light incident thereto. In more detail, the light incident to the light guide plate 550 exits from the light guide plate 550 and travels to the display panel 520 along a direction substantially vertical to an upper surface of the light guide plate 550. The light guide plate 550 includes a transparent material having a relatively high refractive index.

The light incident surface SS is disposed at a lower surface of the light guide plate 550. Therefore, the light emitting diode packages 50 are disposed at the lower side of the light guide plate 550 to correspond to the light incident surface SS. Similarly, the light exit portion OP may correspond to the light incident surface SS. In an exemplary embodiment, for instance, the exit light ET exiting from the light exit portion OP may travel in a direction penetrating through the light incident surface SS.

The light guide plate 550 includes a quantum dot QD provided in plural distributed therein and an area in which the quantum dots QD are distributed may be referred to as a quantum area QDA. The quantum area QDA will be described in detail with reference to FIG. 2.

The exit light ET exiting from the light exit portion OP may be a blue light. The exit light ET is converted by the light guide plate 550 to a yellow light by the quantum dots QD distributed in the quantum area QDA of the light guide plate 550. The yellow light obtained by converting the blue light and the blue light are mixed with each other, and thus a white light WL exits from the light guide plate 550. The light guide plate 550 guides the white light WL within the light guide plate 550 and in a longitudinal direction of the light guide plate 550 and provides the white light WL to the display panel 520 as a surface light source. The longitudinal direction may be substantially parallel to the first direction DR1.

The accommodating member 580 accommodates therein the light emitting unit 100, the reflective plate 570 and the light guide plate 550.

The reflective plate 570 includes a material, e.g., polyethylene terephthalate ("PET"), aluminum, etc., to reflect the light, and is disposed between a bottom portion of the accommodating member 580 and the light guide plate 550. The mold frame 530 defines portions thereof which lengthwise extend along sidewalls of the accommodating member 580 and is coupled to the accommodating member 580. In addition, the mold frame 530 fixes the light guide plate 550 accommodated in the accommodating member 580 to the bottom portion of the accommodating member 580, and the sheets 540 and the display panel 520 are sequentially disposed on the mold frame 530.

The sheets 540 are disposed between the display panel 520 and the light guide plate 550. The sheets 540 include a diffusion sheet 543 diffusing the light, a prism sheet 542 condensing the light to improve a front brightness of the display panel 520, and a protective sheet 541 protecting a rear surface of the display panel 520. A cover member 510 is coupled to the accommodating member 580. In addition, the cover member 510 covers an edge portion of the display panel 520 to allow the display area of the display panel 520 disposed inside of the edge to be exposed to outside the display device 600.

The structure of the backlight assembly 500 should not be limited thereto or thereby. That is, instead of the reflective plate 570 being disposed as a separate member in the accommodating member 580, a reflective layer may instead be coated on the bottom portion of the accommodating member 580 such that the reflective plate 570 is omitted from the backlight assembly 500.

Figure 2:
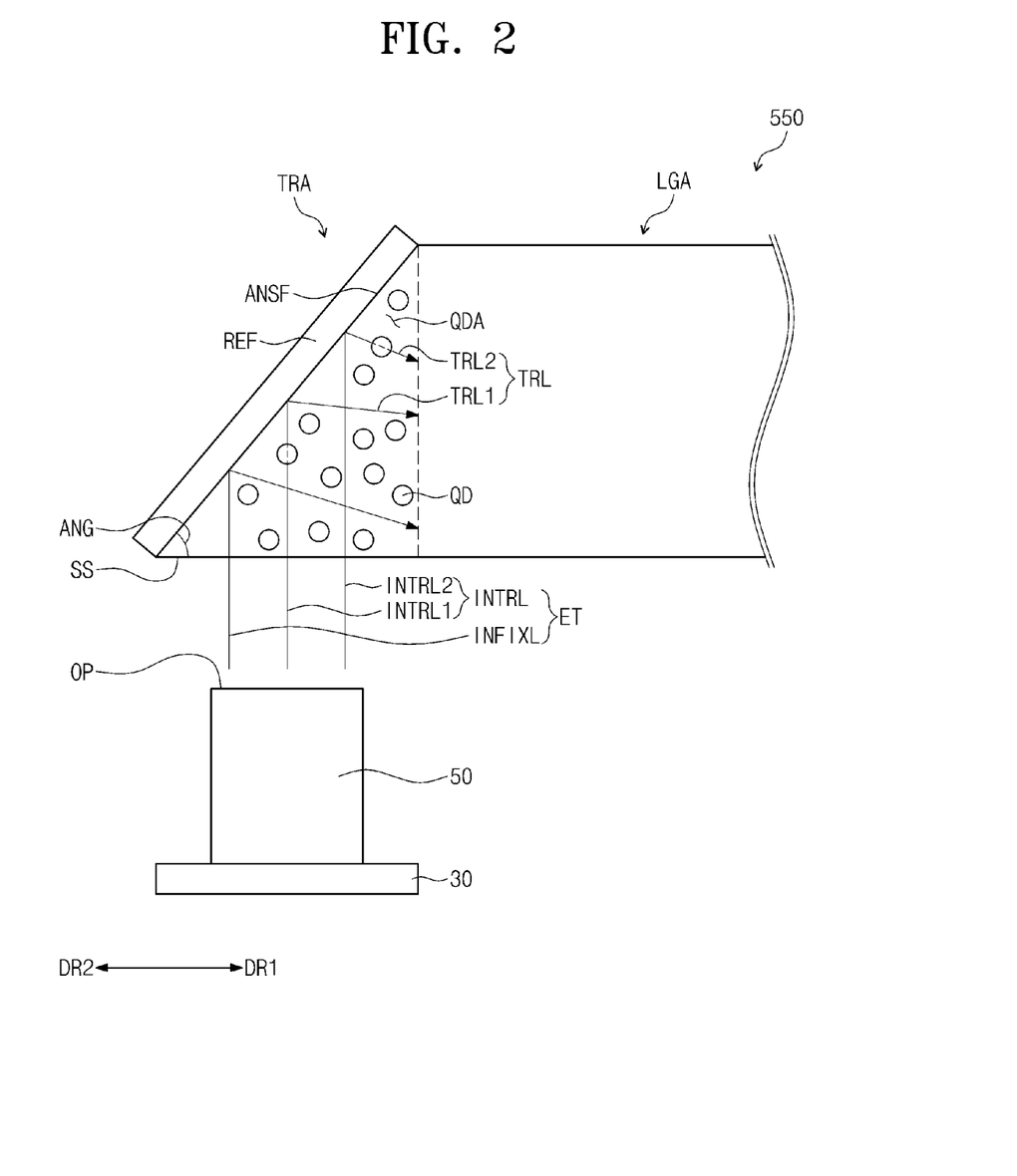
FIG. 2 is a cross-sectional view of the portion of the light guide plate shown in FIG. 1B.

FIG. 2 is a cross-sectional view showing an exemplary embodiment of the portion of the light guide plate 550 shown in FIG. 1B.

Referring to FIG. 2, the light guide plate 550 includes a light guide portion LGA and a light conversion portion TRA. The light guide portion LGA has a substantially plate shape extending from one end of the light conversion portion TRA and in the first direction DR1 to define a distal end of the light guide plate 550 opposite to the light conversion portion TRA.

The exit light ET includes a transmission incident light INFIXL and a conversion incident light INTRL, which each have a first wavelength. The conversion incident light INTRL includes a first conversion incident light INTRL1 and a second conversion incident light INTRL2. The light conversion portion TRA receives the transmission incident light INFIXL and the first and second conversion incident lights INTRL1 and INTRL2 through the light incident surface SS. The light conversion portion TRA converts the first and second conversion incident lights INTRL1 and INTRL2, to a conversion light TRL having a second wavelength. The second wavelength may be different from the first wavelength.

The conversion light TRL includes a first conversion light TRL1 and a second conversion light TRL2. The first conversion incident light INTRL1 is converted by the light conversion portion TRA of the light guide plate 550 to become the first conversion light TRL1 and the second conversion incident light INTRL2 is converted by the light conversion portion TRA of the light guide plate 550 to become the second conversion light TRL2.

The first and second conversion lights TRL1 and TRL2 are incident to the light guide portion LGA of the light guide plate 550 and guided in the first direction DR1 by the light guide portion LGA. The transmission incident light INFIXL is provided to the light guide portion LGA of the light guide plate 550 and guided in the first direction DR1 by the light guide portion LGA.

The transmission incident light INFIXL, the conversion incident light INTRL, and the conversion light TRL will be described in detail later.

An inclined side surface ANSF defined by the light guide plate 550 forms an inclined angle ANG with the light incident surface SS defined by the light guide plate 550. The inclined side surface ANSF has a substantially rectangular planar shape as shown in FIGS. 1A and 1B. The inclined angle ANG may be an acute angle. A whole of the light guide plate 550 body may be defined by a planar portion (e.g., right of the dotted line in FIG. 2), and a non-planar portion (e.g., triangular cross-section, left of the dotted line in FIG. 2). The non-planar portion of the light guide plate 550 defines the inclined side surface ANSF thereof.

The quantum dots QD are distributed in the quantum are QDA. The quantum area QDA corresponds to an area between the inclined side surface ANSF and the light incident surface SS. The quantum dots QD are randomly distributed in the quantum area QDA. The quantum dots QD distributed within the non-planar body portion, and the non-planar body portion together may be considered as defining the quantum area QDA of the light guide plate 550.

A reflector REF is disposed at a side of the inclined side surface ANSF. In more detail, the reflector REF is disposed adjacent to the inclined side surface ANSF in a second direction DR2 from the inclined side surface ANSF, the second direction DR2 being opposite to the first direction DR1. The reflector REF is disposed to be substantially parallel to the inclined side surface ANSF. The reflector REF reflects the transmission incident light INFIXL, the first conversion light TRL1 and the second conversion light TRL2 in the light conversion portion TRA to the light guide portion LGA of the light guide plate 550. The transmission incident light INFIXL having the first wavelength is incident to the quantum area QDA through the light incident surface SS. As illustrated in FIG. 2, the incident transmission incident light INFIXL does not make contact with the quantum dots QD before being reflected by the reflector REF. In addition, the transmission incident light INFIXL is provided to the light guide portion LGA without making contact with the quantum dots QD after being reflected by the reflector REF, and is then guided within the light guide plate 550 and in the first direction DR1 by the light guide portion LGA. In an exemplary embodiment, for instance, the transmission incident light INFIXL having the first wavelength may include the blue light having a blue wavelength. The blue wavelength is a wavelength corresponding to the blue color. The blue wavelength is in a range equal to or greater than about 380 nanometers (nm) and equal to or smaller than about 500 nm.

The first conversion incident light INTRL1 having the first wavelength is provided to the quantum area QDA through the light incident surface SS. As illustrated in FIG. 2, the first conversion incident light INTRL1 is incident to at least one quantum dot of the quantum dots QD of the quantum area QDA before being reflected by the reflector REF. The first conversion incident light INTRL1 incident to the quantum dot QD is first converted to the first conversion light TRL1 having the second wavelength by the quantum dot QD.

In an exemplary embodiment, for instance, the first conversion incident light INTRL1 having the first wavelength may have the blue light having the blue wavelength.

The first conversion light TRL1 having the second wavelength may include the yellow light having a yellow wavelength. The yellow wavelength is a wavelength corresponding to a yellow color. The yellow wavelength is in a range equal to or greater than about 560 nm and equal to or smaller than about 590 nm.

The first conversion light TRL1 may be provided to the light guide portion LGA after being reflected by the reflector REF and may be guided within the light guide plate 550 and in the first direction DR1 by the light guide portion LGA of the light guide plate.

The second conversion incident light INTRL2 having the first wavelength is provided to the quantum area QDA through the light incident surface SS. As illustrated in FIG. 2, the second conversion incident light INTRL2 is not incident to the quantum dots QD before being reflected by the reflector REF. In addition, the second conversion incident light INTRL2 may be provided to the quantum area QDA after being reflected by the reflector REF and may be incident to at least one quantum dot of the quantum dots QD of the quantum area QDA. The second conversion incident light INTRL2 incident to the quantum dot QD is second converted to the second conversion light TRL2 having the second wavelength by the quantum dot QD.

In an exemplary embodiment, for instance, the second conversion incident light INTRL2 having the first wavelength may include the blue light having the blue wavelength.

The second conversion light TRL2 having the second wavelength may include the yellow light having the yellow wavelength.

The second conversion light TRL2 is provided to the light guide portion LGA and guided within the light guide plate 550 and in the first direction DR1 by the light guide portion LGA of the light guide plate 550.

Consequently, the transmission incident light INFIXL having the first wavelength, the first conversion light TRL1 having the second wavelength and the second conversion light TRL2 having the second wavelength may be provided to the light guide portion LGA defined by the light guide plate 550 from the same light conversion portion TRA defined by the light guide plate 550.

As described above, since the first and second conversion lights TRL1 and TRL2 include the yellow light different from the transmission incident light INFIXL, the first conversion light TRL1, the second conversion light TRL2 and the transmission incident light INFIXL are mixed with each other within the light guide plate 550 and the white light WL (refer to FIG. 1B) is guided within the light guide plate 550 and provided to the light guide portion LGA. The white light WL has a color coordinate determined depending on a ratio of the first conversion light TRL1, the second conversion light TRL2 and the transmission incident light INFIXL. In an exemplary embodiment, for instance, among the lights traveling to the light guide portion LGA, x and y values of the white light WL color coordinate when an amount of the first and second conversion lights TRL1 and TRL2 is greater than an amount of the transmission incident light INFIXL may be greater than x and y values of the white light WL color coordinate when the amount of the first and second conversion lights TRL1 and TRL2 is smaller than the amount of the transmission incident light INFIXL.

The white light WL is guided within the light guide plate 550 and in the first direction DR1 by the light guide portion LGA. The white light WL transmits through the upper surface of the light guide plate 550 and is provided to the display panel 520 in the form of a surface light source.

As described above, the conversion efficiency of the exit light ET to the yellow light may be improved by the first-conversion (INTRL1 to TRL1) and the second-conversion (INTRL2 to TRL2) within the quantum area QDA defined in the light guide plate 550.

In more detail, the exit light ET is first converted within the quantum dot area QDA to the yellow light by the quantum dots QD before the exit light ET exiting from the light exit portion OP is reflected by the reflector REF, and the exit light ET is second converted within the quantum dot area QDA to the yellow light by the quantum dots QD after the exit light ET is reflected by the reflector REF. That is, since the exit light ET is converted at least two times within the quantum dot area QDA by the inclined side surface ANSF and the reflector REF, the conversion efficiency of the exit light ET may be improved.

In addition, since the incident light is two times converted by the reflector REF and the inclined side surface ANSF, a process cost of manufacturing a display device may be reduced.

Figure 3:
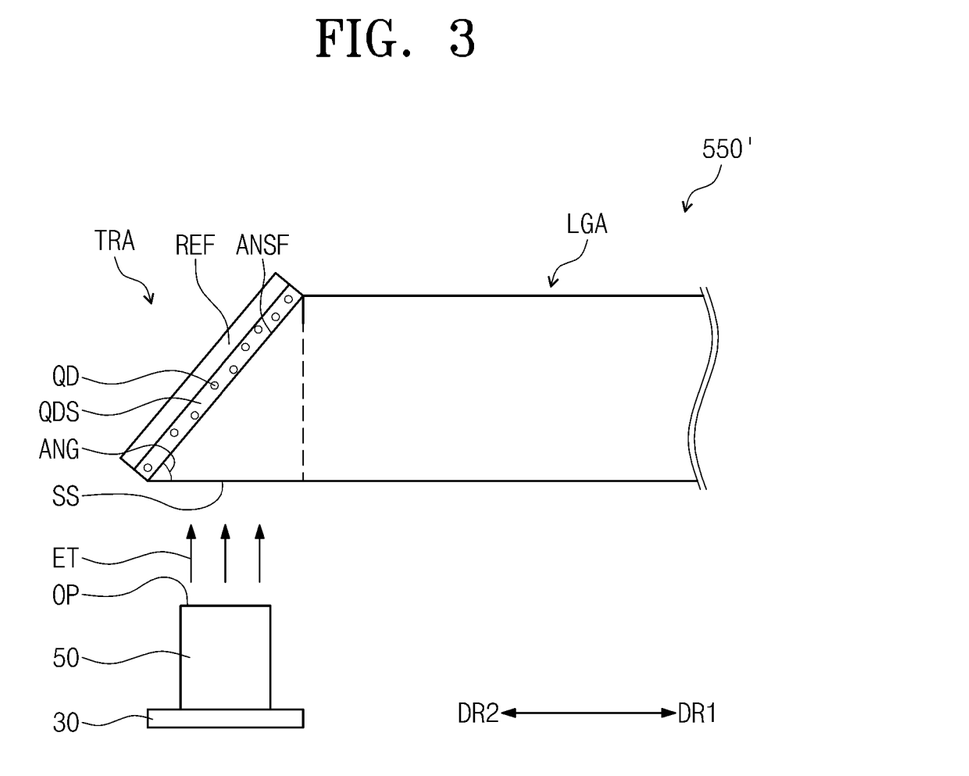
FIG. 3 is a cross-sectional view showing another exemplary embodiment a portion of a light guide plate according to the invention.

FIG. 3 is a cross-sectional view showing another exemplary embodiment of a portion of a light guide plate 550' according to the invention.

Referring to FIG. 3, the quantum dots QD distributed within the non-planar body portion of the light guide plate 550 in the quantum area QDA of the light guide plate 550 shown in FIG. 2 may be replaced with a quantum sheet QDS of the light guide plate 550'.

In detail, the quantum sheet QDS is disposed adjacent to the inclined side surface ANSF in the second direction DR2. The quantum sheet QDS may have a film shape. The quantum sheet QDS is substantially parallel to the inclined side surface ANSF and the reflector REF. The quantum sheet QDS is disposed between the inclined side surface ANSF and the reflector REF.

The quantum dots QD are distributed within the quantum sheet QDS. The quantum sheet QDS converts the exit light ET to the white light WL in the same way as the quantum area QDA shown in FIG. 2. In more detail, the quantum sheet QDS converts the exit light ET to the white light WL through the first and second conversion processes described above.

Different from the light guide plate 550 shown in FIG. 2, the quantum dots QD are provided outside of the inclined side surface ANSF defined by the light guide plate 550' as shown in FIG. 3.

Figure 4:
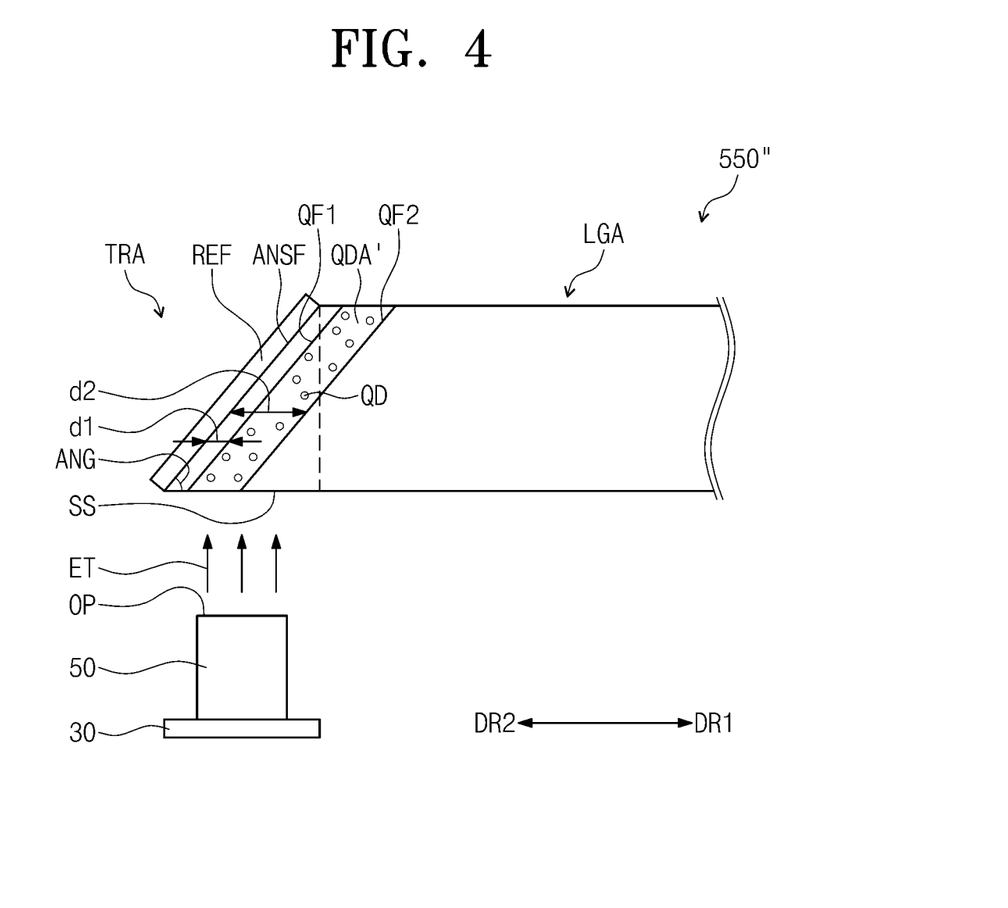
FIG. 4 is a cross-sectional view showing still another exemplary embodiment of a portion of a light guide plate according to the invention.

That is, since the quantum dots QD are provided as a separate sheet form using the quantum sheet QDS, the manufacturing process of the light guide plate 550' may be simplified. Referring to FIG. 3, for purpose of description, the quantum sheet QDS disposed outside the non-planar body portion of the light guide plate 550' and the quantum dots QD distributed within the quantum sheet QDS, and the non-planar body portion of the light guide plate 550' may together define a quantum dot area of the light guide plate 550'. FIG. 4 is a cross-sectional view showing still another exemplary embodiment of a portion of a light guide plate 550" according to the invention.

A whole of the light guide plate 550" body may be defined by a planar portion (e.g., right of the dotted line in FIG. 4), and a non-planar portion (e.g., triangular cross-section, left of the dotted line in FIG. 4). The non-planar portion of the light guide plate 550" defines the inclined side surface ANSF thereof. Quantum dots QD are distributed within both the non-planar body portion and the non-planar body portion of the light guide plate 550".

Referring to FIG. 4, a quantum area QDA' of the light guide plate 550" corresponds to an area defined between a first quantum surface QF1 spaced apart from the inclined side surface ANSF by a first distance d1 in the first direction DR1 and a second quantum surface QF2 spaced apart from the inclined side surface ANSF by a second distance d2 in the first direction DR1. The quantum dots QD are distributed in the quantum area QDA'. That is, the quantum does QD are distributed in portions of both the non-planar body portion and the non-planar body portion of the light guide plate 550".

In more detail, each of the first and second quantum surfaces QF1 and QF2 is substantially parallel to the inclined side surface ANSF and the second distance d2 is greater than the first distance d1.

In an exemplary embodiment of manufacturing a light guide plate, the quantum area QDA' shown in FIG. 4 is formed by injecting quantum dots QD in the first direction DR1 from outside the inclined surface ANSF and through the inclined side surface ANSF defined by the body of the light guide plate 550", e.g., to the inside of the inclined side surface ANSF. In an exemplary embodiment, for instance, the quantum dots QD are injected into the quantum area QDA' by an ion implantation method.

Accordingly, the quantum area QDA' may be formed in the light guide plate 550" to have a predetermined thickness. The thickness may be defined between the first and second quantum surfaces QF1 and QF2 and taken in a direction normal to the first and second quantum surfaces QF1 and QF2.

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:
1. A light guide plate comprising:
  a light conversion portion at which
    a transmission incident light having a first wavelength is transmitted, and
    a conversion incident light having the first wavelength is converted to a converted light having a second wavelength different from the first wavelength; and
  a light guide portion which guides the transmitted transmission incident light and the converted light in a first direction away from the light conversion portion and emits a white light comprising both the transmission incident light and the converted light through an upper surface of the light guide portion,
  wherein the light conversion portion comprises:
    a light incident surface which faces the light source and receives the transmission incident light and the conversion incident light, the light incident surface connected to a lower surface of the light guide portion which faces the upper surface of the light guide portion;
    an inclined side surface inclined with respect to the light incident surface to form an inclined angle with the light incident surface, the inclined side surface connected to the light incident surface and the upper surface of the light guide portion;
    quantum dots which convert light having the first wavelength to light having the second wavelength, the quantum dots distributed in a quantum area disposed on the light incident surface and on the inclined side surface; and
    a reflector disposed adjacent to the inclined side surface in a second direction opposite to the first direction.
2. The light guide plate of claim 1, wherein the light guide portion is extended from the light conversion portion in the first direction.
3. The light guide plate of claim 1, wherein
  the conversion incident light comprises a first conversion incident light and a second conversion incident light each having the first wavelength, and
  the converted light comprises:
    a first converted light having the second wavelength, wherein the quantum dots distributed in the quantum area convert the first conversion incident light to the first converted light before the first conversion incident light is reflected by the reflector, and
    a second converted light having the second wavelength, wherein the quantum dots distributed in the quantum area convert the second conversion incident light to the second converted light after the second conversion incident light is reflected by the reflector.

4. The light guide plate of claim 3, wherein the reflector reflects the transmission incident light, the first converted light and the second conversion incident light in the first direction and toward the light guide portion.

5. The light guide plate of claim 1, wherein the inclined angle is an acute angle.

6. The light guide plate of claim 1, wherein the first wavelength corresponds to a blue color and the second wavelength corresponds to a yellow color.

7. The light guide plate of claim 1, wherein
a body of the light guide plate defines the light incident surface and the inclined side surface which is inclined with respect to the light incident surface, and
the quantum area is defined within the body of the light guide plate as an area thereof between a first quantum surface spaced apart from the inclined side surface by a first distance in the first direction, and a second quantum surface spaced apart from the inclined side surface by a second distance in the first direction, wherein the second distance is greater than the first distance, and at least one of the first and second quantum surfaces is substantially parallel to the inclined side surface.

8. A light guide plate comprising:
a light conversion portion at which
a transmission incident light having a first wavelength is transmitted, and
a conversion incident light having the first wavelength is converted to a converted light having a second wavelength different from the first wavelength; and
a light guide portion which guides the transmitted transmission incident light and the converted light in a first direction away from the light conversion portion and emits a white light comprising both the transmission incident light and the converted light through an upper surface of the light guide portion,
wherein the light conversion portion comprises:
a light incident surface which faces the light source and receives the transmission incident light and the conversion incident light, the light incident surface connected to a lower surface of the light guide portion which faces the upper surface of the light guide portion;
an inclined side surface inclined with respect to the light incident surface to form an inclined angle with the light incident surface, the inclined side surface connected to the light incident surface and the upper surface of the light guide portion;
a reflector disposed adjacent to the inclined side surface in a second direction opposite to the first direction; and
a quantum sheet disposed between the inclined side surface and the reflector, the quantum sheet comprising distributed therein quantum dots which convert light having the first wavelength to light having the second wavelength.

9. The light guide plate of claim 8, wherein the light source is disposed adjacent to a lower side of the light incident surface, generates the transmission incident light and the conversion incident light and emits the transmission incident light and the conversion incident light to the light incident surface.

10. The light guide plate of claim 8, wherein
the conversion incident light comprises a first conversion incident light and a second conversion incident light each having the first wavelength, and
the converted light comprises:
a first converted light having the second wavelength, wherein the quantum dots distributed in the quantum sheet convert the first conversion incident light to the first converted light before the first conversion incident light is reflected by the reflector, and
a second converted light having the second wavelength, wherein the quantum dots distributed in the quantum sheet convert the second conversion incident light to the second converted light after the second conversion incident light is reflected by the reflector.

11. The light guide plate of claim 10, wherein the reflector reflects the transmission incident light, the first converted light and the second conversion incident light in the first direction and to the light guide portion.

12. The light guide plate of claim 8, wherein the inclined angle is an acute angle.

13. The light guide plate of claim 8, wherein the first wavelength corresponds to a blue color and the second wavelength corresponds to a yellow color.

14. A display device comprising:
a backlight assembly which generates white light; and
a display panel which receives the white light from the backlight assembly and displays an image using the white light,
the backlight assembly comprising:
a light source which generates and emits a transmission incident light having a first wavelength and a conversion incident light having the first wavelength; and
a light guide plate comprising:
a light conversion portion which receives the transmission and conversion incident lights and converts the first wavelengths thereof to a converted light having a second wavelength different from the first wavelength, and
a light guide portion which guides the transmission incident light and the converted light in a first direction away from the light conversion portion and emits the white light comprising both the transmission incident light and the converted light through an upper surface of the light guide portion,
the light conversion portion comprising:
a light incident surface which receives the transmission incident light and the conversion incident light, the light incident surface connected to a lower surface of the light guide portion which faces the upper surface of the light guide portion;
an inclined side surface inclined with respect to the light incident surface to form an inclined angle with the light incident surface, the inclined side surface connected to the light incident surface and the upper surface of the light guide portion;
quantum dots which convert light having the first wavelength to light having the second wavelength, the quantum dots distributed in a quantum area disposed on the light incident surface and the inclined side surface; and
a reflector disposed adjacent to the inclined side surface in a second direction opposite to the first direction.

15. The display device of claim 14, wherein the light guide portion is extended from the light conversion portion in the first direction.

16. The display device of claim 14, wherein the light source is disposed adjacent to a lower side of the light incident surface, generates the transmission incident light and the conversion incident light, and emits the transmission incident light and the conversion incident light to the light incident surface.

17. The display device of claim 14, wherein
the conversion incident light comprises a first conversion incident light and a second conversion incident light, and
the converted light comprises:
a first converted light having the second wavelength, wherein the quantum dots distributed in the quantum area convert the first conversion incident light to the first converted light before the first conversion incident light is reflected by the reflector, and
a second converted light having the second wavelength, wherein the quantum dots distributed in the quantum area convert the second conversion incident light to the second converted light after the second conversion incident light is reflected by the reflector.

18. The display device of claim 17, wherein the reflector reflects the transmission incident light, the first converted light and the second conversion incident light to the light guide portion.

19. The display device of claim 14, wherein the inclined angle is an acute angle.

* * * * *